Oct. 9, 1928.

W. H. BASELT 1,686,648

BALANCING DEVICE FOR BRAKE HEADS

Filed April 18, 1927    2 Sheets-Sheet 1

Inventor:
Walter H Baselt,
By Wilkinson, Huxley, Byron, & Knight
attys.

Witness:
R. Burkhardt

Oct. 9, 1928.  
W. H. BASELT  
1,686,648  
BALANCING DEVICE FOR BRAKE HEADS  
Filed April 18, 1927   2 Sheets-Sheet 2
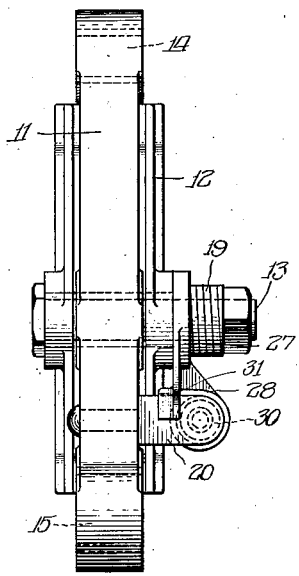
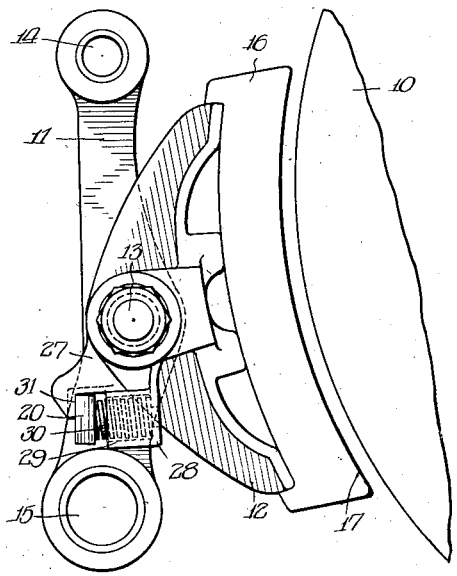
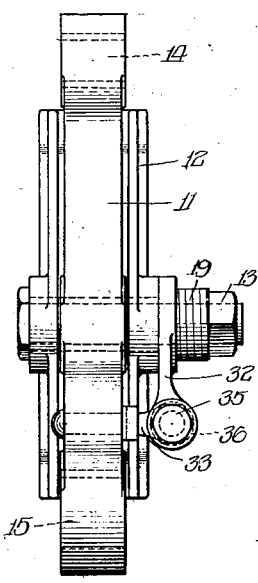
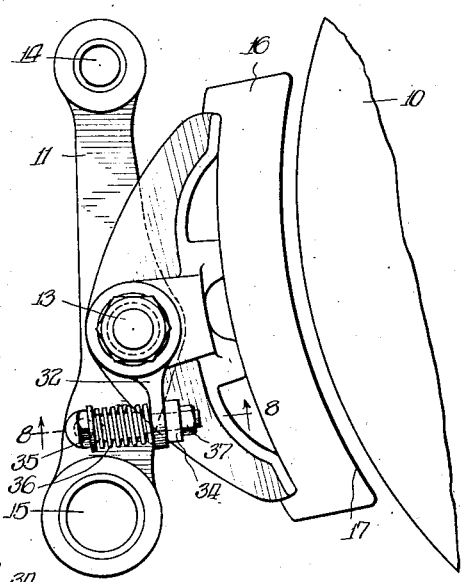
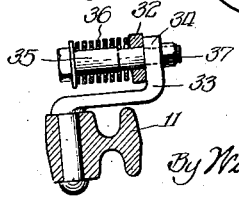
Inventor:  
Walter H. Baselt, Patented Oct. 9, 1928.

1,686,648

UNITED STATES PATENT OFFICE.

WALTER H. BASELT, OF CHICAGO, ILLINOIS, ASSIGNOR TO AMERICAN STEEL FOUNDRIES, OF CHICAGO, ILLINOIS, A CORPORATION OF NEW JERSEY.

BALANCING DEVICE FOR BRAKE HEADS.

Application filed April 18, 1927. Serial No. 184,511.

This invention relates to brake means and more particularly to means for providing a relative movement between a hanger and a brake head and for providing an adjustment of the parts to compensate for wear occasioned by the use of the brake.

In brake mechanisms and more particularly brake mechanisms for railroad cars, it is desirable to provide a head, with arcuate surface which is concentric with the peripheral surface of the associated wheel, both in positions of brake application and in "off" positions and in view of the fact that the brake head and hanger are pivotally supported, a relative movement is provided between the hanger and the brake head to permit the necessary movement.

In addition, it is desirable to provide a resilient means between the hanger and the brake head, giving the head a position in which its arcuate surface is concentric with the periphery of the wheel in "off" position. Under operation, the brake shoe carried by the head by engagement with the periphery wheel is caused by the application of braking force to be moved relative to the hanger and against the opposition of the resilient means to a new position where its arcuate surface is concentric with the periphery of the wheel.

In addition to this provision for relative movement between the parts, it has been found desirable to provide an adjustable abutment for one end of the resilient means, which abutment is connected to move with either the head or the hanger, but which is capable of moving relative thereto under abnormal relative movement between the brake head and the hanger as occasioned by the movement to apply the brakes when the brake shoe has been worn a material extent.

To this end, the principal object of my invention is to provide for a relative yielding movement between the brake head and hanger and for movement of one of the spring abutments, and for adjustment of said abutment under conditions of abnormal relative movement between the hanger and brake head as will be occasioned when the brake shoe becomes worn.

This and other objects are accomplished by means of the arrangement disclosed in the accompanying sheets of drawing, in which—

Figure 4 is a side elevation of a modified form of my invention.

Figure 5 is an end elevation of the device shown in Figure 4.

Figure 6 is a side elevation of a second modified form of my invention.

Figure 7 is an end elevation of the device shown in Figure 6.

Figure 8 is a cross sectional view taken from below on the line 8—8 of Figure 6.

Figure 2:
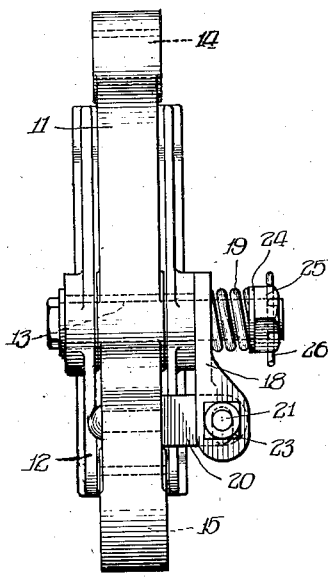
Figure 2 is an end elevation of the device shown in Figure 1.

The various novel features of the invention will be apparent from the following description and drawings and will be particularly pointed out in the appended claims.

Referring to the drawing, it will be noted that my invention relates to a braking device adapted to engage the periphery of an associated wheel 10. The braking device comprises the hanger 11, a braking head 12 pivoted thereto by means of the bolt 13 so that when braking force is applied to the hanger, the braking head will be moved in engagement with the periphery of the wheel 10. The upper end of the hanger is provided with a bearing opening 14 which forms a pivot support for the hanger on the stationary part of the truck frame, and it has a lower end extended below the point of connection of the brake head which is provided with a bearing opening 15, adapted to be connected to suitable operating mechanism to draw the hanger and brake head toward and away from the wheel during the application and release of the brake. On the face of the brake head 12 is a brake shoe 16 with an arcuate engaging surface 17 having the same curvature as the periphery of the wheel.

Mounted in engagement with the surface of the brake head and positioned on the bolt 13 is an arm 18 forced inwardly for frictional contact with the brake head by means of the spring 19 positioned on the bolt. The arm 18 has a perforated extension 38 which is positioned, when the brake is in "off" position in contact with the lug 20, provided on the hanger. The lug is likewise perforated, the perforations being in alignment in a manner to accommodate the bolt 21 around which is placed the spring 22 in abutment with the head of the bolt and the lug 20. The bolt is held against displacement by means of the nut 23. The bolt 13 which forms a pivot between the hanger and the brake head has a washer 24 on one end thereof which forms an abutment for the spring 19, the washer being held in place by means of the nut 25 and the cotter pin 26.

Referring to Figures 4 and 5, the parts are substantially similar, except for the construction of the arm which in this instance is designated 27. The arm 27 is constructed with a yoke extension, one arm 28 of which is constructed to form a cup 29 which receives the coil spring 30. The other arm of the yoke forms an abutment 31 which is maintained at the "off" position of the brake in engagement with the lug 20 on the hanger by means of the spring. The parts are so proportioned as to provide for a slight clearance between the lug 20 and the cup portion of the yoke whereby a relative movement may be effected betwen the hanger and brake head through the resilience of the spring.

Figure 1:
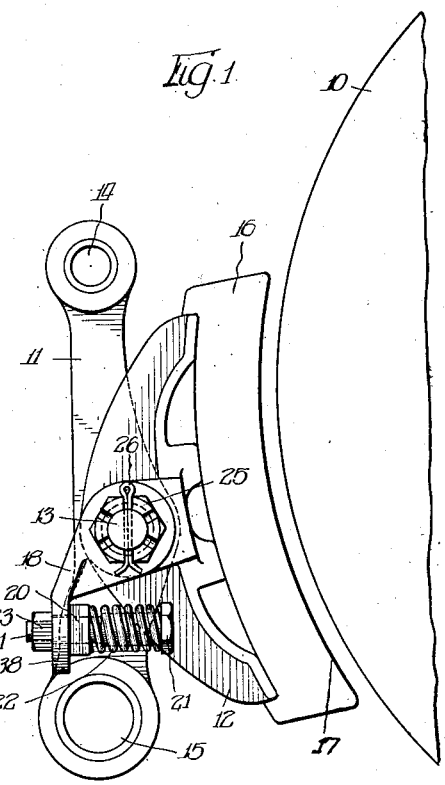
Figure 1 is a side elevation of a brake device constructed in accordance with my invention.

Referring to Figure 6, the parts are substantially similar, except that the bolt and spring are positioned in the reverse direction, the arm designated 32 being positioned forward of the position shown in Figure 1. In this case, instead of the customary lug 20 provided on the hanger, an S-shaped bracket is provided which has a transverse portion 34 held by the spring in engagement with the arm 32. This arrangement necessitates that the bolt 35 be positioned in reverse direction through the perforations provided in the arm and the bracket so that the coil spring 36 will bear against the arm instead of the lug, the bolt being held in position by means of the nut 37.

One of the advantages in providing a bolt positioned in the manner shown in Figure 6 is that the entire mechanism lies within the confines of the outer dimensions of the device, whereby projection of small breakable parts beyond the outer surface of the device is eliminated.

Figure 3:
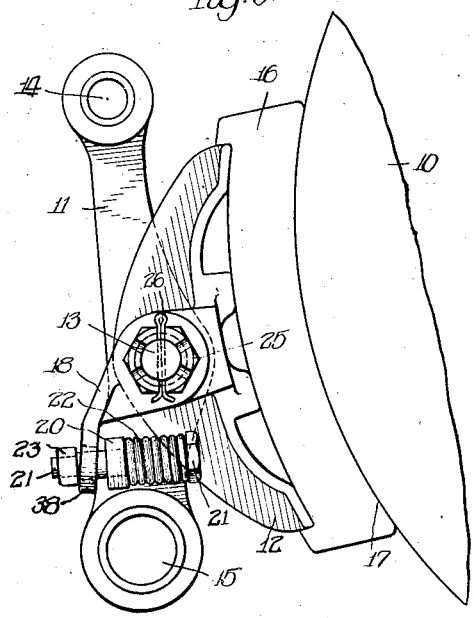
Figure 3 is a view similar to Figure 1 showing the relationship of the parts in brake applying position.

In operation when the brake device is first installed a new shoe is provided which has considerable thickness as shown in Figure 1. The brake head is pivoted at an initial angular position relative to the hanger which position is effected by the frictionally bound arm engaging the lug carried by the hanger, under the action of the spring, the arm and brake head being releasably held to move together by the frictional engagement at the pivot point. This initial position is such that the curvature of the brake head and shoe is concentric with the periphery of the associated wheel in "off" position of the brake and the yielding pivotal movement between the head and the hanger which is permitted through the yielding of the spring permits the brake shoe to move to a position where its curvature is concentric with the periphery of the wheel in brake applying position, as shown in Figure 3.

In the event the brake shoe becomes worn, it will necessitate a further movement of the hanger to cause an engagement with the wheel and consequently, a greater angular movement of the head relative to the hanger will be required to compensate for the necessary increased distance to be traversed to effect the braking contact. This would require an increased amount of yielding on the part of the spring as the wear increases, and consequently an increase in tension set up by the spring, except for the fact that the frictionally bound arm in my construction is permitted to move relative to the brake head after a predetermined amount of angular movement between the brake head and hanger has been effected. This operation moves the brake head to a new position relative to the frictionally bound arm, whereby when the arm and abutment are held in contact, the brake head is in a new position which is concentric with the periphery of the wheel in "off" position and is capable of, through the yielding action of the spring, assuming a concentric relationship when in brake applying position.

It will be noted that the structure I have provided utilizes a single means for permitting the yielding movement of the brake head and hanger for "on" and "off" positions, and also, for effecting the relative movement of the arm and brake head to place the brake head in a new initial position relative to the hanger for the purpose of compensating for wear. The movement of the arm on its friction connection may be accomplished by the complete seating of the spring, that is, under maximum compression or it may exert a force under compression at a predetedmined point which will overcome the friction resistance between the arm and the head in order to effect the movement therebetween, and a corresponding new adjusted position.

I claim:

1. The combination of a brake hanger, a brake head pivotally connected thereto, an arm mounted to turn with the brake head through a limited movement relative to the hanger, and a compression spring of limited compressibility between said hanger and arm, said spring being adapted to seat and form a non-compressible column between said hanger and arm.

2. In brake mechanism the combination of a hanger and a brake head pivotally connected together, one of which has an abutment thereon, the other of which has an adjustable abutment connected to move therewith, and a spring element capable of only a predetermined amount of yielding movement between said abutments whereby a predetermined relative movement between said hanger and brake head is permitted by the yielding of said spring, but excessive movement will operate to completely compress said spring and to transmit therethrough movement to adjust the position of said adjustable abutment.

3. In brake mechanism the combination of a hanger and a brake head pivotally connected together, one of which has an abutment thereon, and the other of which has a movable abutment connected to move therewith under application of a predetermined force, but relative thereto under an excessive force application, a spring element associated with said abutments tending to resist relative movement therebetween, but yielding a predetermined amount without exerting a force in excess of said predetermined force, but acting to move said movable abutment on its connection under application of force in excess of said predetermined force.

4. In a brake mechanism the combination of a hanger and a brake head pivotally connected together, one of which has an abutment thereon, and the other of which has an arm frictionally bound thereto, a spring element associated with said abutment and arm acting to resist relative movement therebetween, said spring element being capable of a predetermined yielding movement to permit relative movement between said abutment and arm, but acting to move said arm on its connection, in opposition to the frictional engagement, upon an excessive movement between said hanger and brake head.

5. In a brake mechanism, the combination of a hanger and a brake head pivotally connected together, one of which has an abutment thereon and the other of which has an arm frictionally bound thereto, said arm having a yoke portion straddling said abutment, and a spring between said abutment and one arm of said yoke.

6. In a brake mechanism, the combination of a hanger and a brake head pivotally connected together, one of which has an abutment thereon and the other of which has an arm frictionally bound thereto, said arm having a yoke portion straddling said abutment, one arm of said yoke being constructed to form a cup, a spring seated in said cup, and engaging said abutment, said parts permitting a predetermined relative movement under the yielding action of said spring, but acting to move said arm in opposition to the frictional connection, upon excessive movement between said hanger and brake head.

Signed at Chicago, Illinois, this 14th day of April, 1927.

WALTER H. BASELT.